US 12,097,950 B2

(12) United States Patent
Venn et al.

(10) Patent No.: US 12,097,950 B2
(45) Date of Patent: Sep. 24, 2024

(54) RETRACTABLE AIRCRAFT LANDING GEAR

(71) Applicants: Airbus Operations Limited, Bristol (GB); Airbus Operations SAS, Toulouse (FR)

(72) Inventors: Robert Venn, Bristol (GB); Andy Mounty, Bristol (GB); Matthew Marples, Bristol (GB); Laurent Tizac, Toulouse (FR)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 17/735,606

(22) Filed: May 3, 2022

(65) Prior Publication Data

US 2022/0355917 A1  Nov. 10, 2022

(30) Foreign Application Priority Data

May 4, 2021 (GB) ..................................... 2106348

(51) Int. Cl.
*B64C 25/26* (2006.01)
(52) U.S. Cl.
CPC .................................... *B64C 25/26* (2013.01)
(58) Field of Classification Search
CPC ..................................................... B64C 25/26
See application file for complete search history.

(56) References Cited

U.S. PATENT DOCUMENTS

| 2,444,319 A | * | 6/1948 | Winter | .................... | B64C 25/26 |
| | | | | | 244/102 SL |
| 2,668,030 A | * | 2/1954 | Smith | .................... | B64C 25/26 |
| | | | | | 74/529 |

(Continued)

FOREIGN PATENT DOCUMENTS

| CA | 2 923 787 A1 | 9/2016 |
| CA | 2 990 219 A1 | 6/2018 |

(Continued)

OTHER PUBLICATIONS

Search Report for GB2106348.2, dated Nov. 4, 2021, 4 pages.
Extended European Search Report for Application No. EP 22171367.0, 10 pages, dated Sep. 12, 2022.

*Primary Examiner* — Joseph W Sanderson
(74) *Attorney, Agent, or Firm* — Nixon & Vanderhye P.C.

(57) ABSTRACT

An aircraft landing gear is disclosed including a main leg, a foldable stay and a lock link configured to hold the foldable stay in position when the landing gear is extended. The foldable stay includes a first stay member and a second stay member, and the landing gear is configured such that the second stay member rotates in a first direction from a first position to a second position as the landing gear moves from a retracted configuration to an extended configuration. An end stop is arranged such that in the event the lock link fails, the second stay member rotates in the first direction from the second position to a third position in which the stay contacts the end stop thereby preventing further movement of the second stay member in the first direction and wherein the foldable stay goes over centre as the second stay member moves from the first position to the third position.

16 Claims, 8 Drawing Sheets

(56) References Cited

U.S. PATENT DOCUMENTS

| | | | | |
|---|---|---|---|---|
| 2,941,755 | A * | 6/1960 | Westcott, Jr. | B64C 25/26 244/102 R |
| 3,393,883 | A | 7/1968 | Smith et al. | |
| 5,022,609 | A * | 6/1991 | Cranston | B64C 25/12 244/102 R |
| 8,602,352 | B2 * | 12/2013 | Keller | B64C 25/26 244/102 R |
| 8,820,679 | B2 * | 9/2014 | Martinez | B64C 25/14 244/102 SL |
| 9,004,401 | B2 * | 4/2015 | Evans | B64C 25/26 244/102 SL |
| 9,862,483 | B2 * | 1/2018 | Schmidt | B64C 25/10 |
| 9,878,780 | B2 * | 1/2018 | Schmidt | B64C 25/26 |
| 10,293,920 | B2 * | 5/2019 | Mellor | F16H 21/44 |
| 10,364,022 | B2 * | 7/2019 | Bond | B64C 25/30 |
| 10,414,510 | B2 * | 9/2019 | Schmidt | B64D 29/08 |
| 11,117,651 | B2 * | 9/2021 | Evans | B64C 25/26 |
| 11,161,600 | B2 * | 11/2021 | Fortier | B64C 25/58 |
| 11,180,244 | B2 * | 11/2021 | Evans | B64C 25/22 |
| 11,235,864 | B2 * | 2/2022 | White | B64C 25/26 |
| 11,390,379 | B2 * | 7/2022 | Bennett | B64C 25/26 |
| 11,414,181 | B2 * | 8/2022 | Price | B64C 25/26 |
| 11,643,191 | B2 * | 5/2023 | Bennett | B64C 25/26 244/102 R |
| 2008/0191090 | A1 | 8/2008 | Chow et al. | |
| 2011/0163202 | A1 * | 7/2011 | Martinez | B64C 25/10 244/102 SL |
| 2012/0080559 | A1 * | 4/2012 | Keller | B64C 25/14 244/102 A |
| 2013/0119197 | A1 | 5/2013 | Ducos | |
| 2013/0181091 | A1 * | 7/2013 | Evans | F16H 25/14 244/102 A |
| 2013/0299633 | A1 | 11/2013 | Tierney et al. | |
| 2015/0246724 | A1 | 9/2015 | Empson et al. | |
| 2016/0137295 | A1 * | 5/2016 | Bond | B64C 25/26 244/102 A |
| 2016/0272303 | A1 * | 9/2016 | Schmidt | B64C 25/20 |
| 2016/0272305 | A1 * | 9/2016 | Schmidt | B64C 25/26 |
| 2018/0065733 | A1 * | 3/2018 | Mellor | B64C 25/26 |
| 2018/0186446 | A1 | 7/2018 | Schmidt | |
| 2019/0144104 | A1 * | 5/2019 | Fortier | B64C 25/20 244/102 R |
| 2019/0152589 | A1 * | 5/2019 | Evans | B64C 25/20 |
| 2019/0185145 | A1 * | 6/2019 | Price | B64C 25/22 |
| 2019/0202550 | A1 * | 7/2019 | Evans | F15B 1/024 |
| 2020/0094950 | A1 * | 3/2020 | Bennett | B64C 25/20 |
| 2020/0130817 | A1 | 4/2020 | White | |
| 2022/0281589 | A1 * | 9/2022 | Bennett | B64C 25/26 |
| 2024/0017821 | A1 * | 1/2024 | Castellan | B64C 25/62 |

FOREIGN PATENT DOCUMENTS

| | | |
|---|---|---|
| CA | 3 056 581 A1 | 3/2020 |
| EP | 3 498 600 A1 | 6/2019 |
| FR | 2 967 252 | 5/2012 |

* cited by examiner

RETRACTABLE AIRCRAFT LANDING GEAR

CROSS RELATED APPLICATION

This application claims priority to United Kingdom Patent Application GB 2106348.2, filed May 4, 2021, the entire contents of which is hereby incorporated by reference.

BACKGROUND OF THE INVENTION

The present invention concerns aircraft landing gear, particularly retractable landing gear. More particularly, but not exclusively, this invention concerns a landing gear assembly having a stop arranged to limit movement of a foldable stay in the event of a lock link failure. The invention also concerns an aircraft including such a landing gear assembly and a method of operating such an aircraft landing gear assembly.

A landing gear often includes a main leg (or strut) and one or more stays (for example drag stays, or side stays) via which the leg is connected to the rest of the aircraft structure. A lock link is often used to lock a stay in position when the landing gear is deployed so as to maintain the landing gear in the extended configuration. It would be advantageous to provide a landing gear in which the risk of the landing gear moving out of position in the event that the lock link fails is reduced. It would be advantageous to do so in a manner that is mechanically simple, and/or in a space and/or weight efficient manner.

The present invention seeks to mitigate the above-mentioned problems. Alternatively or additionally, the present invention seeks to provide an improved landing gear assembly.

SUMMARY OF THE INVENTION

According to a first aspect of the invention there is provided an aircraft landing gear assembly comprising: a main leg; a foldable stay; a lock link and an end stop. The foldable stay comprises a first stay member and a second stay member. The first stay member may be pivotally connected to the second stay member. The second stay member may be pivotally mounted on the main leg. The landing gear assembly may be configured such that the second stay member rotates in a first direction from a first position to a second position relative to the main leg as the landing gear assembly moves from a retracted configuration to an extended configuration. The landing gear assembly comprises a lock link configured to prevent rotation of the second stay member away from the second position in the first direction when the lock link is in a locked position. The landing gear assembly comprises an end stop arranged such that in the event the lock link fails, the second stay member rotates in the first direction from the second position to a third position. The end stop may be arranged such that when the stay is in contact with the end stop further movement of the second stay member in the first direction is prevented. It may be that the foldable stay goes over centre as the second stay member moves from the first position to the third position.

Thus, landing gear assemblies in accordance with the present invention use an over-centre stop to reduce the risk of the landing gear moving out of position in the event that the lock link fails. The end stop may prevent a continuation of the extension movement of the foldable stay while the over centre position of the stay means gravity opposes movement of the foldable stay in the other direction. The foldable stay (and thereby the main leg) is therefore held in position.

The term 'over-centre' position is well understood in the art. In this case, the foldable linkage may have a range of motion. In a first part of the range of motion, the second stay member will rotate in the second direction when the landing gear assembly is free to move under the action of gravity and the weight of the aircraft. In a second part of the range of motion, the second stay member will rotate in the first direction when the landing gear assembly is free to move under the action of gravity and the weight of the aircraft. The first and second parts of the range of motion may be separated by a centre position of the foldable stay. It may be that the foldable stay is straight (e.g. the two stay members are aligned in a straight line) when the foldable stay is in the centre position. It may be that when the second stay member is in the first position the foldable linkage is in the first part of the range of motion. It may be that when the second stay member is in the second position the foldable linkage is in the second part of the range of motion. The foldable stay may be said to go over centre when it passes from the first part of the range of motion to the second part of the range of motion.

The foldable stay may go over centre as the second stay member moves from the first position to the second position. Thus, the lock link may be configured to hold the foldable stay in an over-centre position.

It may be that the second stay member is pivotally connected at a first pivot point to the main leg and/or at a second pivot point to the first stay member. It may be that the first stay member is pivotally connected at a first pivot point to the second stay member and/or configured for pivotal connection, for example to the rest of the aircraft, at a second pivot point. It may be that each of the first and second stay member has a longitudinal axis being a notional straight line between the first and second pivot points of that member. A first angle may defined as an angle between the longitudinal axis of the first stay member and the longitudinal axis of the second stay member.

The landing gear may be configured such that the first angle increases as the landing gear assembly moves from a retracted configuration to an extended configuration. It may be that the first angle is greater than 180 degrees when the stay is in contact with the end stop. It may be that the first angle is less than 180 degrees when the second stay member is in the first position. It may be that the first angle is 180 degrees when the second stay member is in the second position. It may be that the first angle is greater than 180 degrees when the second stay member is in the second position. It may be that the first angle increases when the second stay member moves from the second position to the third position. The foldable stay may have a centre position. The centre position may occur when the first angle is 180 degrees. The centre position may occur when the second stay member is in the second position.

A second angle may be defined as the other angle between the longitudinal axis of the first stay member and the second stay member. It may be that the total of the first and second angles is always 360 degrees. It may be that the second angle decreases as the landing gear assembly moves from the retracted configuration to the extended configuration. It may be that the second angles is less than 180 degrees when the second stay member is in the third position.

It may be that the end stop is arranged such that the stay contacts the end stop in an abutting relationship such that the end stop mechanically prevents further movement of the second stay member in the first direction. The end stop may comprise a member located and shaped so as to provide such an abutting relationship. The end stop may comprise a metal member. Thus, the end stop may be a mechanical simple means of reducing the risk of the landing gear moving out of position following a lock link failure.

It may be that the end stop is arranged to contact the second stay member such that further movement of the second stay member in the first direction is prevented. It may be that the end stop is arranged to limit movement of the foldable stay by contacting the second stay member. It may be that the end stop is mounted on the main leg, for example in a region adjacent the point at which the second stay member is mounted to the leg. Mounting the end stop on the main leg may facilitate integration of the landing gear with the aircraft by avoiding the need to mount the end stop within the landing gear bay where space may be at a premium.

It may be that the end stop is arranged to contact the first stay member such that further movement of the second stay member in the first direction is prevented. It may be that the end stop in mounted on the aircraft structure, for example adjacent the point at which the stay is mounted to the aircraft structure. It may be that the stay is pivotally connected to the main leg at a first end and configured for connection to the aircraft at a second, opposite end. It may be that the stop is mounted on the aircraft structure in the region of second end of the stay, for example an end of the first stay member. Mounting the end stop on the aircraft structure may reduce the weight of the landing gear which must be moved by the landing gear retraction actuator and/or reduces the modification to the landing gear required to incorporate the present invention (for example facilitating modification of existing landing gear/aircraft to include the end stop of the present invention).

It may be that the end stop is mounted on, for example integrally formed with, one of the first and second stay member, to contact the other of the first and second stay member such that further movement of the second stay member in the first direction is prevented. Incorporating the end stop within the stay may avoid the need to mount the end stop in the landing gear bay where space is at a premium and/or on the main leg which may have an aerodynamic penalty.

It may be that the second stay member is pivotally connected at a first end to the main leg and/or at a second end to the first stay member. Thus, the first pivot point of the second stay member may be located in the region of the first end of the second stay member, and/or the second pivot point may be located in the region of the second end of the second stay member. It may be that the first stay member is pivotally connected at a first end to the second stay member and/or configured for pivotal connection at a second end to the rest of the aircraft. Thus, the first pivot point of the first stay member may be located in the region of the first end of the first stay member, and/or the second pivot point may be located in the region of the second end of the first stay member. It may be that the first stay member comprises a pintle, for example at the second end of the first stay member, for mounting the stay to the rest of the aircraft.

It may be that the foldable stay is a drag stay. It may be that, in use, the drag stay extends forward of the landing gear, for example in a direction substantially perpendicular to the axis of rotation of the wheels. A drag stay may be defined as a stay arranged to transmit drag loads from the wheels of a landing gear to the rest of the aircraft (for example via the main leg). Drag load may be defined as the horizontal component of the retarding force on the wheels of a landing gear and acts in a direction perpendicular to the axis of rotation of the wheels.

It may be that the foldable stay is a side-stay. A side-stay may be defined as a stay extending in an inboard or outboard direction, at an angle of 30 degrees of more to the longitudinal axis of the aircraft to which the landing gear is (to be) mounted.

The lock link may be configured for movement between an unlocked position, it which the foldable stay is free to move relative to the main leg and a locked position in which the lock link prevents movement of the foldable stay relative to the main leg. The landing gear may be configured so that the lock link is in the locked position when the landing gear is in the extended configuration. The landing gear may be configured so that the lock link is in the locked position when the foldable stay is in a centre or over-centre position. The landing gear may be configured so that the lock link is in the locked position when the second stay member is in the second position. It may be a first end of the lock link is pivotally mounted on the stay and a second end of the lock link is pivotally mounted on the main leg, for example to the main fitting of the main leg. The lock link may comprise two link members, pivotally connected to each other, a first link member being mounted on the stay and a second link member being mounted on the leg. The lock link may comprise a lock link spring or other locking mechanism arranged to hold the link members in an over centre position and thereby prevent movement of the foldable stay relative to the main leg. The lock link may be of any conventional type known to the skilled person. The form of the lock link is not of particular significant in the context of the present invention and will not be described further here. Failure of the lock link may be defined as the lock link no longer being capable of preventing rotation of the second stay member away from the second position in the first position, for example as a result of mechanical failure or malfunction of the lock link, one or more lock links or the locking mechanism.

It may be that one or more wheels is mounted at one end of the main leg, for example via a bogie of axle. The main leg may have a proximal end which is located closer to the point at which the landing gear is mounted to the rest of the aircraft than a distal end of the leg. The wheels may be mounted to the main leg in the region of the distal end. The main leg may comprise a main fitting via which the landing gear is mounted to the rest of the aircraft. The main fitting may be configured for mounting to the aircraft for rotational movement relative thereto. The main fitting may be located at the proximal end of the main leg.

The retracted configuration may be defined as the configuration of the landing gear assembly when the aircraft is in flight. It may be that the main leg is located within the aircraft, for example within a landing gear bay of the aircraft when the landing gear is in the retracted position. The extended configuration may be defined as the configuration of the landing gear when the aircraft is taxiing. It may be that at least part of the main leg is located outside the aircraft body when the landing gear is in the extended configuration. It may be that the landing gear is configured to support the weight of the aircraft when the landing gear is in the extended configuration.

The aircraft may be a fixed wing aircraft, for example a commercial passenger aircraft (or an aircraft capable of use in that capacity), for example an aircraft configured to transport more than fifty passengers, for example more than one hundred passengers. Alternatively, the aircraft may be a helicopter, drone or spacecraft.

In a second aspect of the invention, there is provided an aircraft landing gear assembly comprising a main leg; a foldable stay comprising a first stay member and a second stay member, the first stay member is pivotally connected at a first pivot point to the second stay member and configured for pivotal connection at a second pivot point and the second stay member is pivotally connected at a first pivot point to the main leg and at a second pivot point to the first stay member; each of the first and second stay members has a longitudinal axis being a notional straight line between the first and second pivot points and a first angle is defined as an angle between the longitudinal axis of the first stay member and the longitudinal axis of the second stay member; and wherein the landing gear assembly is configured such that the first angle increases as the landing gear assembly moves from a retracted configuration to an extended configuration, the first angle being less than 180 degrees when the landing gear is in the retracted configuration. The landing gear assembly further comprises a lock link, for example connected between the foldable stay and the main leg, configured to lock the foldable stay in position when the landing gear is in the extended configuration. The landing gear further comprises an end stop arranged to limit the increase in the first angle in the event the lock link fails by limiting movement of the foldable stay, and wherein the first angle is greater than 180 degrees when the foldable stay is in contact with the end stop.

In a third aspect of the invention, there is provided a method of operating a landing gear, the landing gear comprising a main leg, a foldable stay comprising first and second stay members, a lock link, and an end stop, and the first stay member is pivotally connected at a first pivot point to the second stay member and configured for pivotal connection at a second pivot point and the second stay member is pivotally connected at a first pivot point to the main leg and at a second pivot point to the first stay member; each of the first and second stay members has a longitudinal axis being a notional straight line between the first and second pivot points and a first angle is defined as an angle between the longitudinal axis of the first stay member and the longitudinal axis of the second stay member. It may be that during normal operation the stay folds as the landing gear retracts, such that a first angle between the first stay member and the second stay members reduces; the stay unfolds as the landing gear extends, such that the first angle between the first stay member and the second stay members increases; and the lock link holds the stay in a first position when the landing gear is extended; and in the event the lock link fails, the stay continues to unfold until it contacts the end stop which prevents further unfolding, and the first angle is greater than 180 degrees when the stay is in contact with the end stop.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
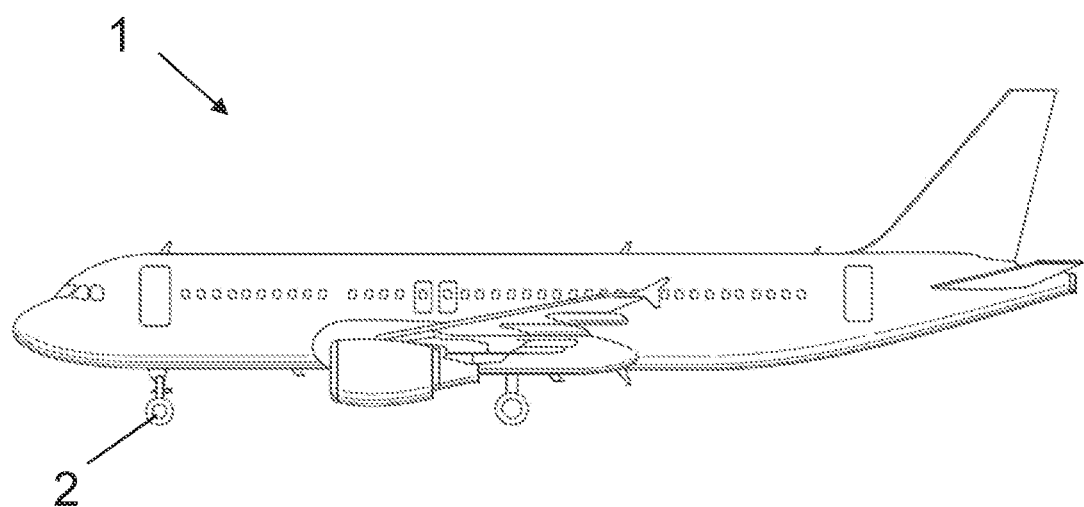
FIG. 1 shows a side view of an aircraft including a landing gear in accordance with embodiments of the invention.
Figure 2:
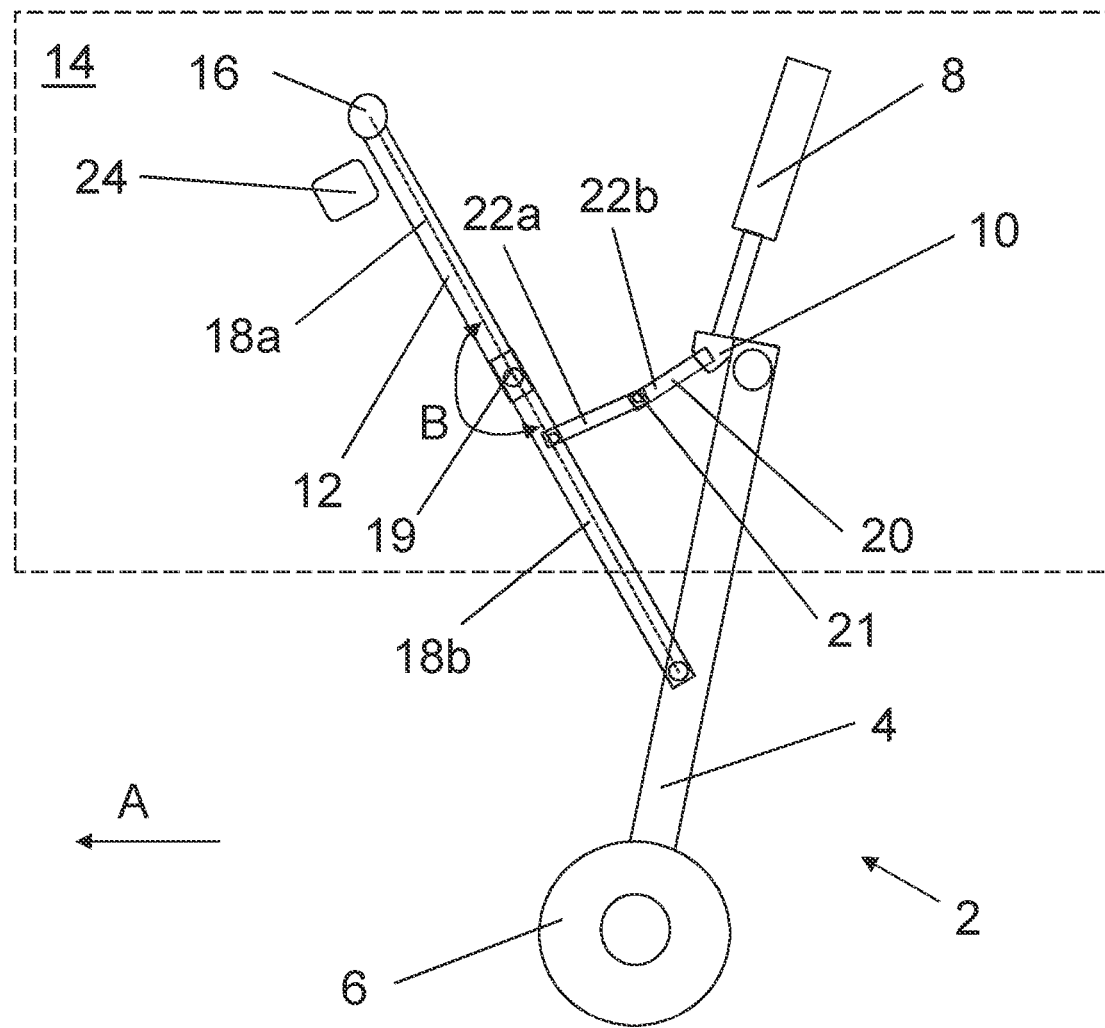
FIG. 2 shows a side view of a landing gear in accordance with a first example embodiment in the extended configuration.

FIG. 1 shows an aircraft 1 including a nose landing gear 2. FIG. 2 shows a side view of a nose landing gear 2 suitable for use in the aircraft 1 of FIG. 1. The landing gear 2 comprises a main leg 4 with a pair of wheels 6 mounted at the distal end (the lower end in FIG. 2). An actuator 8 is connected to the proximal end (the upper end in FIG. 2) of the main leg 4 at a main fitting 10. A drag stay 12 is pivotally connected at one end to the main leg 4 and at the other end to the rest of the aircraft structure 14 (denoted by a dashed line box in FIG. 2) via a pintle 16. The drag stay 12 comprises two stay members: a first stay member 18a and a second stay member 18b. The first stay member 18a is connected at one end to the pintle 16 and pivotally connected at the other end to the second stay member 18b at pivot point 19. The second stay member 18b is pivotally connected at one end to the first stay member 18a at pivot point 19 and at the other end to the main leg 4. A lock link 20 extends between the second stay member 18b and the main fitting 10. The lock link 20 comprises two link members: a first link member 22a and a second link member 22b. The first link member 22a is pivotally connected at one end to the second stay member 18b and pivotally connected at the other end to the second link member 22b at a pivot point 21. The second link member 22b is pivotally connected at one end to the first link member 22a and pivotally connected at the other end to the main fitting 10. The form of the main fitting 10 and pintle 16 and their connection with the aircraft structure 14 will be well known to the skilled person, as will the construction of the lock link 20 and will not be discussed further here. An end stop 24 is mounted on the aircraft structure 14 adjacent the upper end of the first stay member 18a, near the pintle 16. Arrow A indicates the forward direction of the aircraft 1 in flight and points to the left of FIG. 2. An angle labelled B is shown on the lower side of drag stay 12 in FIG. 2 and extends between the longitudinal axes (denoted by a dashed line in FIG. 2) of the first stay member 18a and the second stay member 18b. It will be appreciated that a complementary angle will be formed between the longitudinal axis of the two stay members on the upper side of the stay.

In FIG. 2 the landing gear 2 is shown in the extended configuration, with the drag stay 12 substantially straight and the lock link 20 in an over-centre position. The first stay member 18a is spaced apart from the end stop 24 and the angle B is in the region of 183 degrees.

Figure 3:
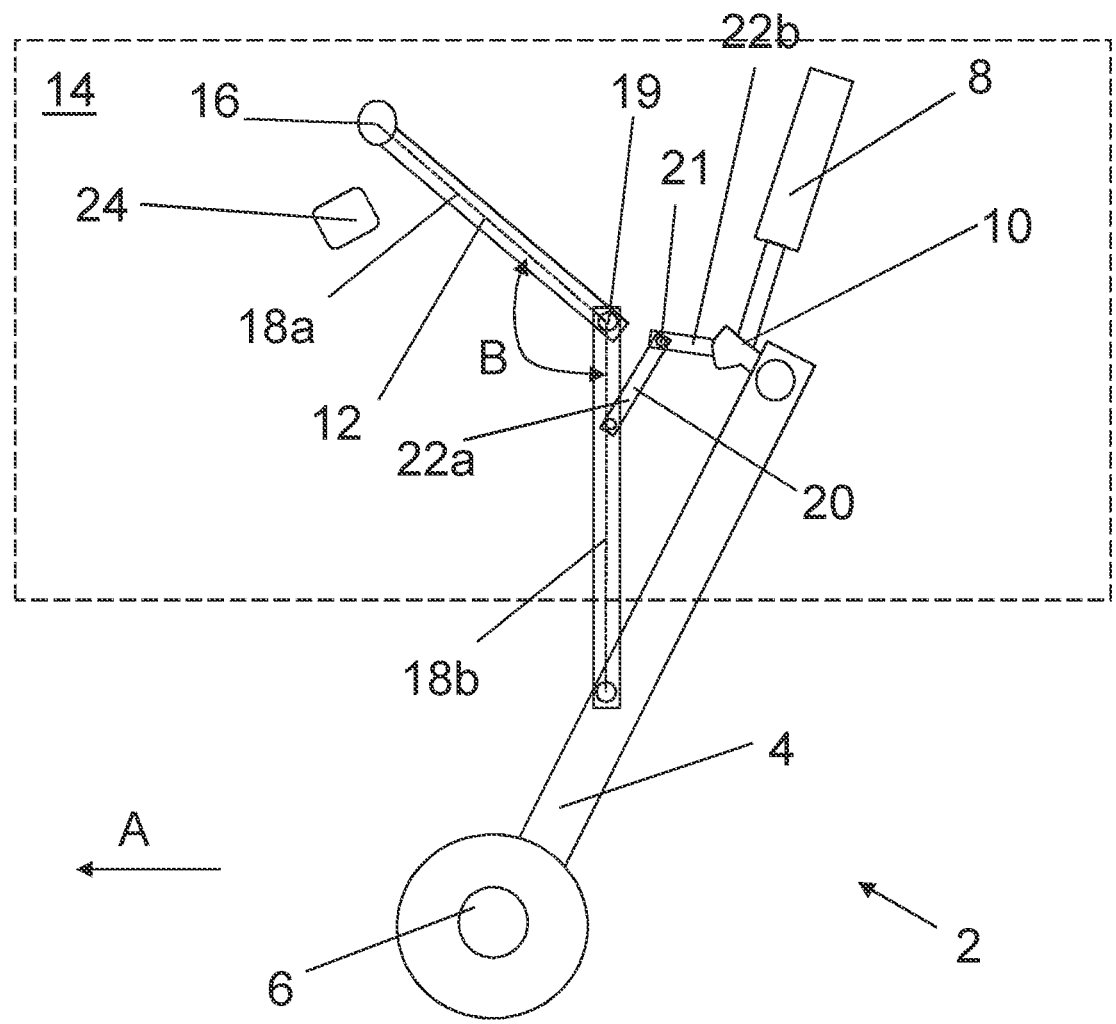
FIG. 3 shows a side view of the landing gear of FIG. 2 when partially retracted.
Figure 4:
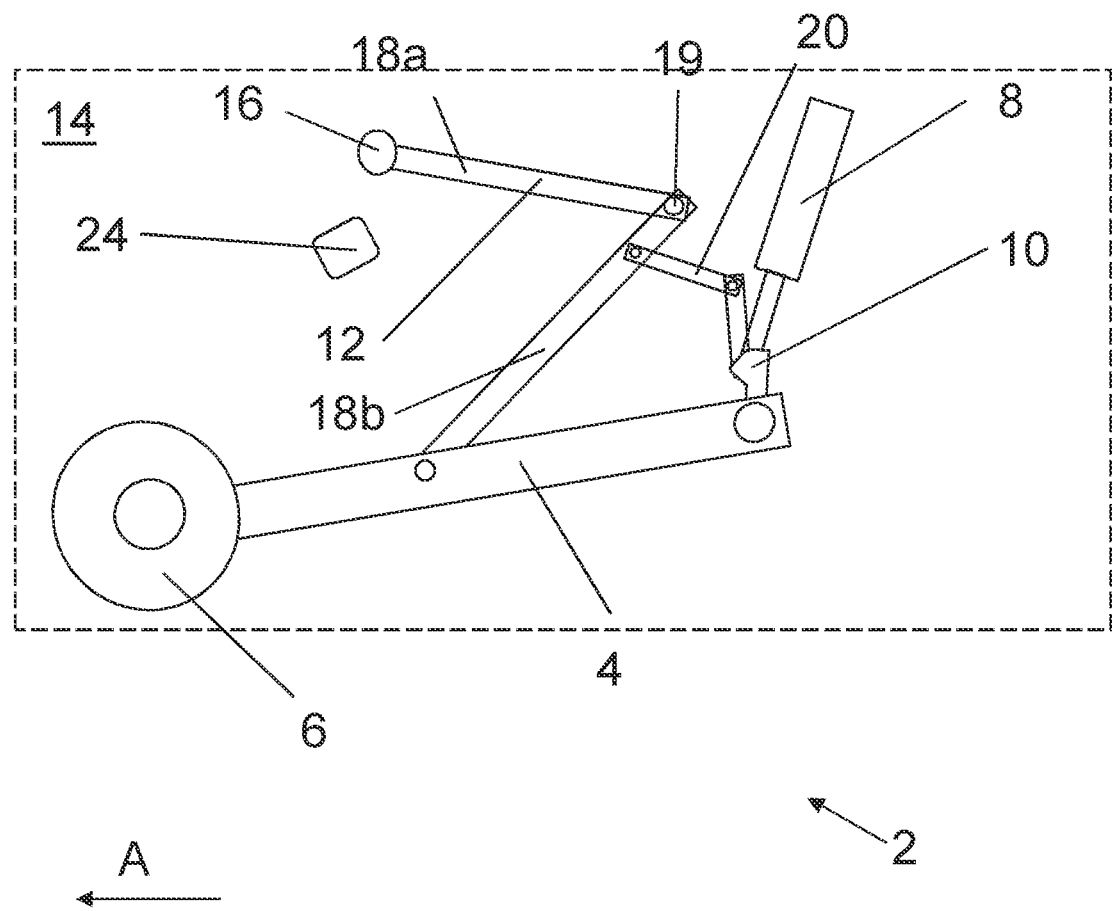
FIG. 4 shows a side view of the landing gear of FIG. 2 in the retracted configuration.

FIG. 3 shows the landing gear 2 of FIG. 2 partway through the retraction process, i.e. as the landing gear 2 moves away from the extended position if FIG. 2 towards the retracted position of FIG. 4. In FIG. 3 the main leg 4 is rotated clockwise about the pivot axis of main fitting 10 and the wheels 6 are located forward and above their position in FIG. 2 relative to the aircraft (to the left and up in FIGS. 1 to 4). The first stay member 18a is rotated anticlockwise about the pivot axis of pintle 16 (i.e. away from the end stop 24). The drag stay 12 is folded with the pivot point 19 between the first and second stay members 18a, 18b located to the rear and above its position in FIG. 2 relative to the aircraft (to the right and up in FIGS. 2 to 4). The angle B between the first and second stay members 18a, 18b on the lower side of the drag stay 12 in FIG. 3 is reduced in comparison with FIG. 2 and is significantly less than 180 degrees. The lock link 20 is also folded, with the pivot point 21 between the first and second link members 22a, 22b located above its position in FIG. 2 relative to the aircraft.

In FIG. 4 the landing gear 2 of FIG. 2 is show in a retracted configuration, with the main leg 4 and wheels 6 within aircraft structure 14.

Figure 5:
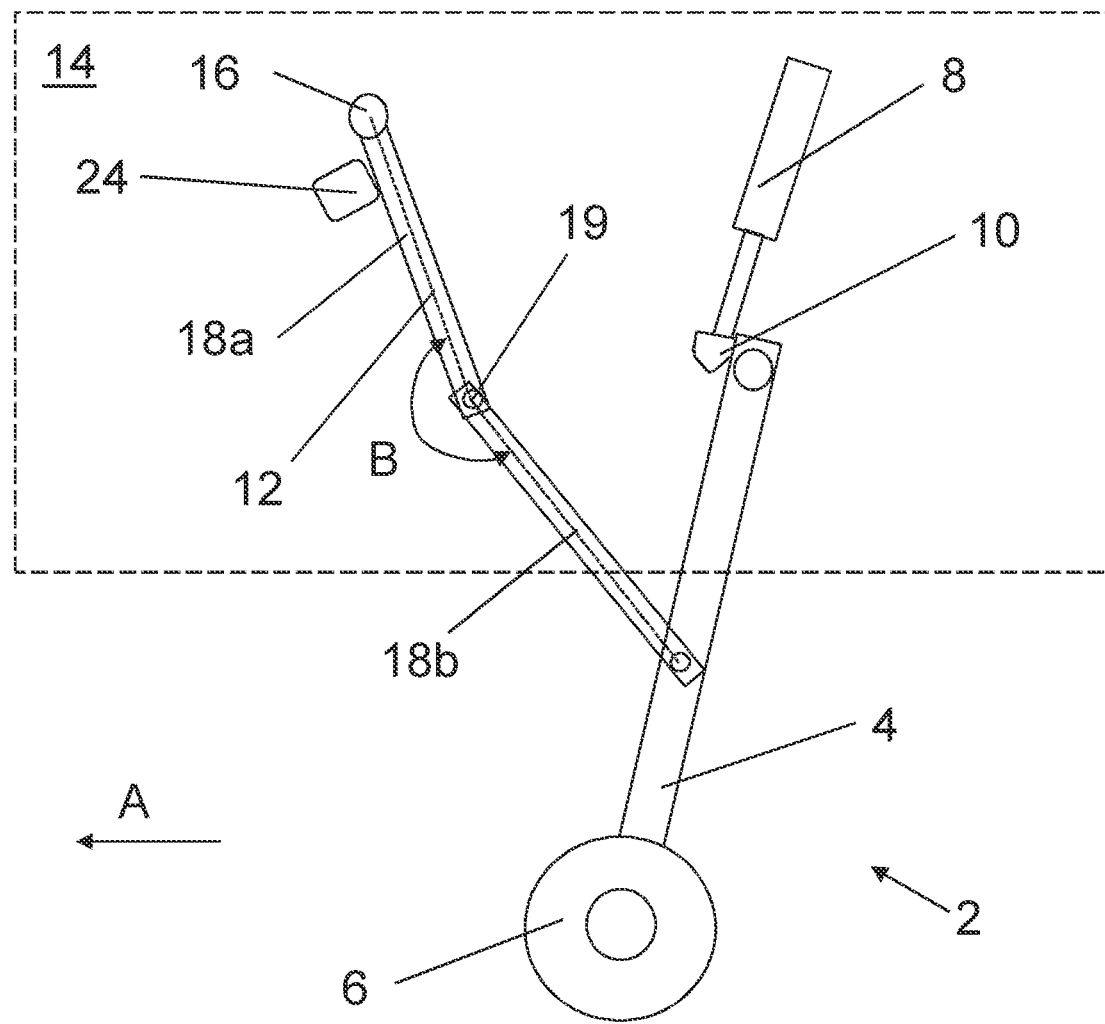
FIG. 5 shows a side view of the landing gear of FIG. 2 following a lock link failure.

In FIG. 5, the landing gear 2 is shown in the configuration adopted following a failure of the lock link 20. For the purposes of illustration lock link 20 is absent from FIG. 5, but it will be appreciated that failure of the lock link 20 may not result in such a total absence of the lock link 20. As compared with FIG. 2, in FIG. 5 the first stay member 18a is rotated clockwise about the pivot axis of pintle 16 and the first stay member 19a now abuts end stop 24. The drag stay 12 has folded with the pivot point 19 between the first and second stay members 18a, 18b located forward and below its position in FIG. 2 relative to the aircraft (to the left and down in FIGS. 2 to 4). The angle B is increased in comparison with FIG. 2, and is significantly more than 180 degrees. Thus, in FIG. 5, foldable stay 5 is in an over-centre position. Main leg 4 is rotated slightly clockwise about the pivot axis of main fitting 10 and the wheels 6 are located forward and above their position in FIG. 2 relative to the aircraft (to the left and up in FIGS. 2 to 4). However the displacement of the main leg 4 and wheels 6 as between FIG. 2 and FIG. 5 is very much less than as between FIG. 2 and FIG. 3 or FIG. 4.

In use, actuator 8 pivots main leg 4 about the pivot axis of main fitting 10 to move the landing gear 1 between the extended and retracted configurations. As the landing gear moves to the extended configuration (i.e. from FIG. 4 to FIG. 2) the link members 22a, 22b of the lock link 20 unfold until the longitudinal axes of the link member 22a, 22b are aligned in a straight line (i.e. the lock link is straight) and then continue to rotate relative to each other to reach the over centre position shown in FIG. 2 in the usual manner. The first and second stay members 18a, 18b unfold (angle B increases), with the pivot point 19 moving downward until the longitudinal axes of the first and second stay members 18a, 18b are aligned in a straight line as shown in FIG. 2. The first and second stay members 18a, 18b of the drag stay 12 are then held in place by lock link 20. Between them, the lock link 20 and dray stay 12 hold the main leg in the extended position. In the event the lock link 20 fails, the first and second stay members 18a, 18b become free to move and the pivot point 19 continues to drop downward under the action of gravity and the weight of the aircraft (angle B increases). The first stay member 18a continues to rotate clockwise until it contacts end stop 24, at which point the longitudinal axes of the first and second stay members 18a, 18b are no longer aligned in a straight line (angle B is greater than 180 degrees) and the drag stay 12 is in an over-centre position. Further movement of the first stay member 18a in the clockwise direction is prevented by the end stop 24, while further movement in the other direction is prevented by the action of gravity and the weight of the aircraft. In this way, significant movement of the main leg 4 away from the extended position is prevented even through the lock link 20 has failed. Thus, the risk of the landing gear moving out of the extended configuration following a lock link failure is reduced in landing gear in accordance with the present example embodiment by the presence of an end stop arranged to limit the movement of the drag stay beyond an over centre position. An end stop may be a particularly mechanically simple way of achieving this reduction in risk, and/or may achieve the reduction of risk in a space and/or weight efficient manner.

Figure 6:
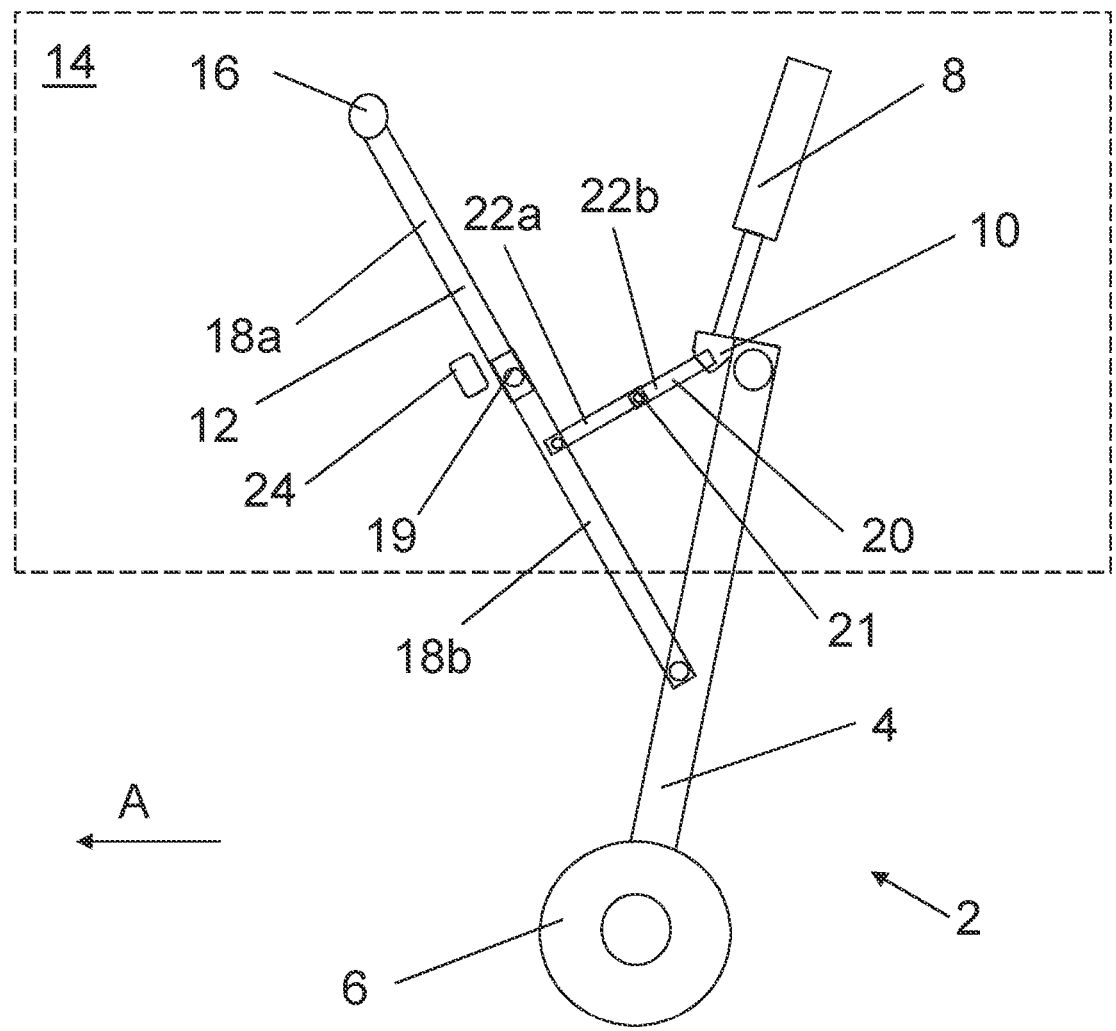
FIG. 6 shows a side view of a landing gear in accordance with a second example embodiment in the extended configuration.

FIG. 6 shows a landing gear according to a second example embodiment of the invention, suitable for use in the aircraft 1 of FIG. 1. The landing gear of FIG. 6 is shown in the extended configuration, and its operation is substantially as described above for FIGS. 2 to 5. Only those aspects of the FIG. 6 embodiment that differ with respect to the embodiment of FIGS. 2 to 5 will be discussed here Like elements are represented with the same reference numerals as between FIGS. 2 to 5 and FIG. 6, for example the drag stay is labelled 12 in both embodiments. In FIG. 6, the end stop 24 is located adjacent pivot point 19, near the lower end of first stay member 18a. In use, in the event of a failure of lock-link 20, the first stay member 18a again rotates clockwise until it abuts end stop 24.

Figure 7:
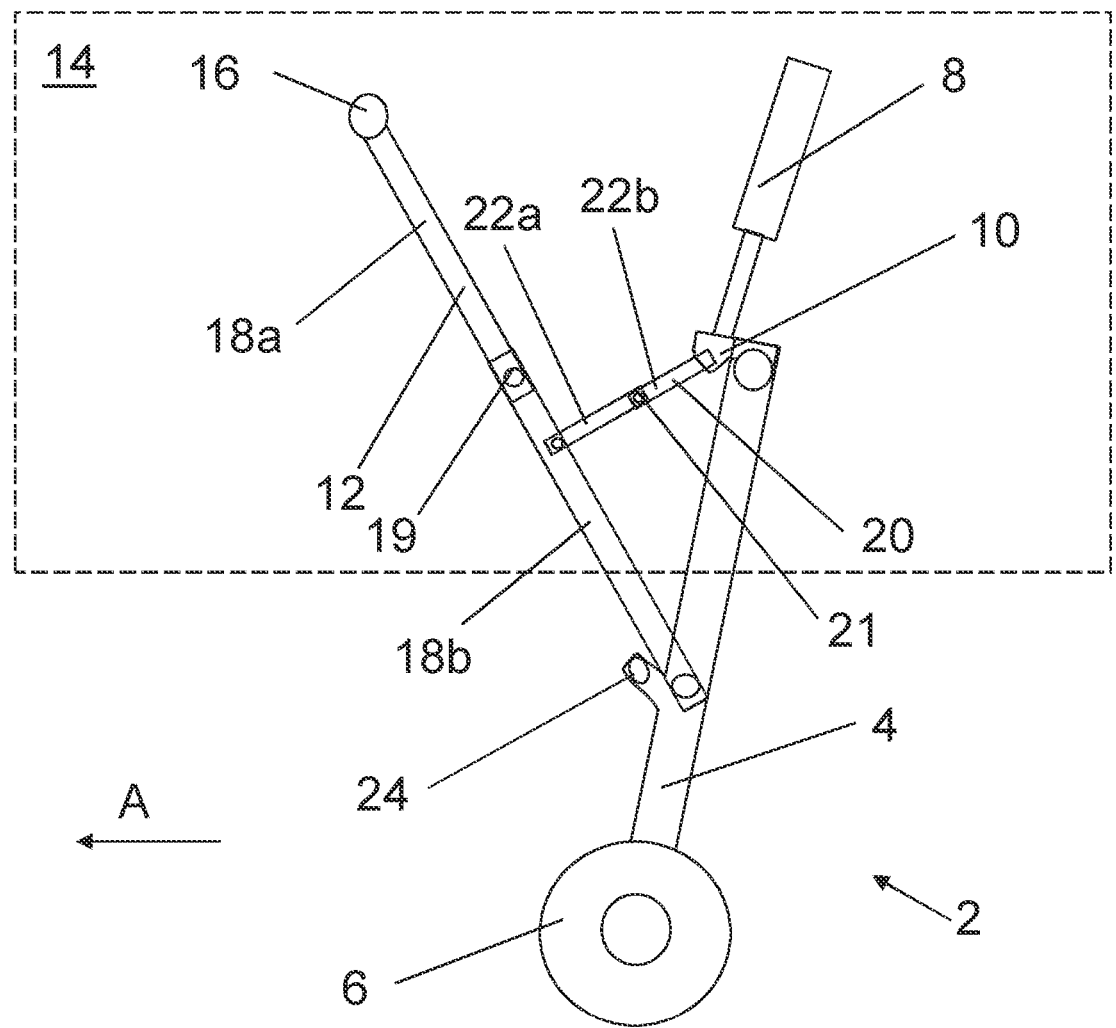
FIG. 7 shows a side view of a landing gear in accordance with a third example embodiment in the extended configuration; and, FIG. 8 shows a flow chart of an example method in accordance with the invention.

FIG. 7 shows a landing gear according to a second example embodiment of the invention, suitable for use in the aircraft 1 of FIG. 1. The landing gear of FIG. 7 is shown in the extended configuration, and its operation is substantially as described above for FIGS. 2 to 5. Only those aspects of the FIG. 7 embodiment that differ with respect to the embodiment of FIGS. 2 to 5 will be discussed here Like elements are represented with the same reference numerals as between FIGS. 2 to 5 and FIG. 7, for example the drag stay is labelled 12 in both embodiments. In FIG. 7, the end stop 24 is mounted on main leg 4, and protrudes therefrom into a region adjacent the end of second stay member 18b where is mounted on main leg 4. In use, in the event of a failure of lock-link 20, the second stay member 18b rotates anticlockwise about its pivotal connection with main leg 4 (the same direction of motion as the second stay member 18b following a lock link 20 failure in the embodiment of FIGS. 2 to 5) until it abuts end stop 24. Again, this cause the drag-stay 12 to occupy an over-centre position and thereby prevents further movement of main leg 4.

Figure 8:
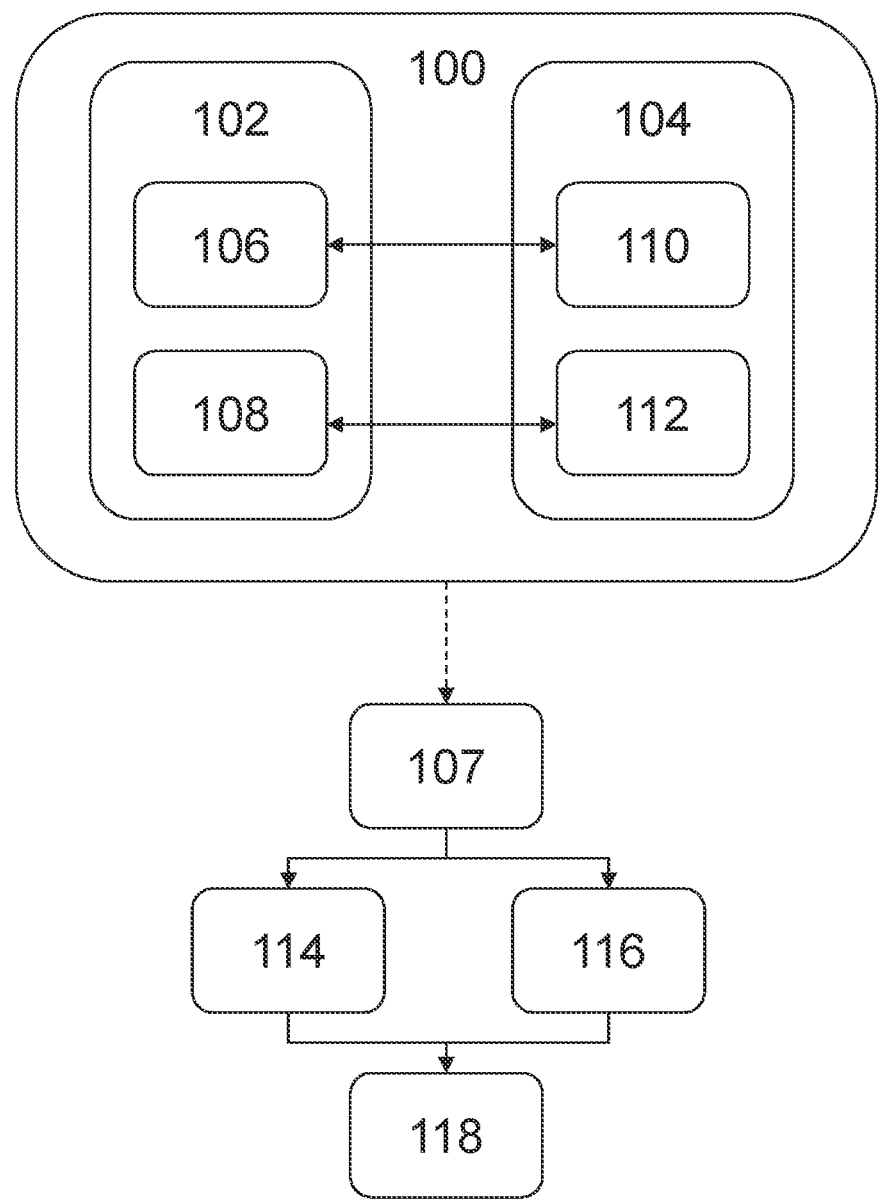

FIG. 8 shows a flow chart of an example method of operating a landing gear in accordance with the present invention, e.g. the landing gear of any of FIGS. 2 to 7 as described above. In normal operation 100 the landing gear extends 102 (i.e. moves from the retracted to the extended configuration) and retracts 104 (i.e. moves from the extended to the retracted configuration). During extension 102, the first stay member rotates in a first direction 106 and the drag stay unfolds 108 (angle B increases) until the drag stay is straight (angle B is at or in the region of 180 degrees). During retraction 104, the first stay member rotates in a second, opposite direction 110 and the drag stay folds 112 (angle B decreases). In the event of a lock link failure 107, the first stay member rotates in the first direction 114 and the drag stay unfolds further 116 (angle B increases and exceeds 180 degrees). The first stay member rotates in the first direction 114 until the stay abuts 118 the end stop which prevents further movement of the first stay member in the first direction. The action of gravity on the landing gear 2 prevents movement of the drag stay away from the over-centre position which it occupies when the stay abuts the end stop. In this way, further movement of the main leg is prevented following a lock link failure.

In some embodiments, the end stop 24 may be a metal member, for example a painted metal member. Thus, the construction of end stop 24 may be particularly simple thereby reducing the risk of failure.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The above examples describe a nose landing gear, but it will be appreciated that the end stop of the present invention may be used with other types of retractable landing gear, for example main landing gear, including wing and/or body mounted landing gear. The above examples describe an end stop arranged to limit the movement of a drag stay to an over-centre position, but it would be appreciated that an end stop may be used with any type of foldable stay having an appropriate retraction and extension kinematic. For example, an end stop may be used with a side stay or other type of stay.

The above examples show stay members 18 as elongate members, but it will be appreciated that the shape of the stay members may vary. Nevertheless, even if the shape of the members varies, it is possible to define a notional longitudinal axis between the two relevant pivot points of a stay member.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear assembly, comprising:
a main leg;
a foldable stay comprising a first stay member and a second stay member, the first stay member being pivotally connected to the second stay member, the second stay member being pivotally mounted on the main leg, the landing gear assembly is configured such that the second stay member rotates in a first direction from a first position to a second position relative to the main leg as the landing gear assembly moves from a retracted configuration to an extended configuration;
a lock link configured to prevent rotation of the second stay member away from the second position in the first direction when the lock link is in a locked position; and,
an end stop arranged such that in the event the lock link fails, the second stay member rotates in the first direction from the second position to a third position in which the foldable stay contacts the end stop thereby preventing further movement of the second stay member in the first direction and wherein the foldable stay goes over centre as the second stay member moves from the first position to the third position.

2. An aircraft landing gear assembly according to claim 1, wherein
the second stay member is pivotally connected at a first pivot point to the main leg and at a second pivot point to the first stay member;
the first stay member is pivotally connected at a first pivot point to the second stay member and configured for pivotal connection at a second pivot point;
each of the first and second stay members has a longitudinal axis being a notional straight line between the first and second pivot points;
a first angle is defined as an angle between the longitudinal axis of the first stay member and the longitudinal axis of the second stay member; and,
the landing gear is configured such that the first angle increases as the landing gear assembly moves from the retracted configuration to the extended configuration, and the first angle is greater than 180 degrees when the stay is in contact with the end stop.

3. An aircraft landing gear assembly according to claim 1, wherein the end stop is arranged to contact the second stay member such that further movement of the second stay member in the first direction is prevented.

4. An aircraft landing gear assembly according to claim 3, wherein the end stop is mounted on the main leg.

5. An aircraft landing gear assembly according to claim 1, wherein the end stop is arranged to contact the first stay member such that further movement of the second stay member in the first direction is prevented.

6. An aircraft landing gear assembly according to claim 5, wherein the second end of the first stay member is pivotally connected to the aircraft structure and the end stop is mounted on the aircraft structure in the region of the second end of the stay.

7. An aircraft landing gear assembly according to claim 1, wherein the end stop is mounted on one of the first and second stay member, to contact the other of the first and second stay member such that further movement of the second stay member in the first direction is prevented.

8. An aircraft landing gear assembly according to claim 1, wherein the second stay member is pivotally connected at a first end to the main leg and at a second end to the first stay member, and the first stay member is pivotally connected at a first end to the second stay member and configured for pivotal connection at a second end to the rest of the aircraft.

9. An aircraft landing gear assembly according to claim 1, wherein the foldable stay is a drag stay.

10. An aircraft landing gear assembly according to claim 1, wherein the foldable stay is a side-stay.

11. An aircraft landing gear assembly according to claim 1, wherein a first end of the lock link is pivotally mounted on the stay and a second end of the lock link is pivotally mounted on the main leg.

12. An aircraft landing gear assembly according to claim 11, wherein the second end of the lock link is pivotally mounted to a main fitting of the main leg.

13. An aircraft landing gear assembly according to claim 1, wherein the landing gear is a nose landing gear assembly.

14. An aircraft including an aircraft landing gear assembly according to claim 1.

15. A method of operating a landing gear, the landing gear comprising a main leg, a foldable stay comprising first and second stay members, a lock link, and an end stop, and the first stay member is pivotally connected at a first pivot point to the second stay member and configured for pivotal connection at a second pivot point and the second stay member is pivotally connected at a first pivot point to the main leg and at a second pivot point to the first stay member; each of the first and second stay members has a longitudinal axis being a notional straight line between the first and second pivot points and a first angle is defined as an angle between the longitudinal axis of the first stay member and the longitudinal axis of the second stay member; and wherein:

during normal operation the stay folds as the landing gear retracts, such that the first angle between the first stay member and the second stay members reduces; the stay unfolds as the landing gear extends, such that the first angle between the first stay member and the second stay members increases; and the lock link holds the stay in a first position when the landing gear is extended; and in the event the lock link fails, the stay continues to unfold until it contacts the end stop which prevents further unfolding, and the first angle is greater than 180 degrees when the stay is in contact with the end stop.

16. An aircraft landing gear assembly, comprising:

a main leg;

a foldable stay comprising a first stay member and a second stay member, the first stay member is pivotally connected at a first pivot point to the second stay member and configured for pivotal connection to the rest of the aircraft at a second pivot point and the second stay member is pivotally connected at a first pivot point to the main leg and at a second pivot point to the first stay member;

each of the first and second stay members has a longitudinal axis being a notional straight line between the first and second pivot points and a first angle is defined as an angle between the longitudinal axis of the first stay member and the longitudinal axis of the second stay member; and wherein the landing gear assembly is configured such that the first angle increases as the landing gear assembly moves from a retracted configuration to an extended configuration, the first angle being less than 180 degrees when the landing gear is in the retracted configuration;

a lock link configured to lock the foldable stay in position when the landing gear is in the extended configuration; and, an end stop arranged to limit the increase in the first angle in the event the lock link fails by limiting movement of the foldable stay, and wherein the first angle is greater than 180 degrees when the foldable stay is in contact with the end stop.

\* \* \* \* \*